United States Patent [19]

Yang

[11] Patent Number: 5,245,380
[45] Date of Patent: Sep. 14, 1993

[54] SHUTTER AND IRIS COMBINED AUTOMATIC EXPOSURE DEVICE

[75] Inventor: Jae-Wan Yang, Suwon, Rep. of Korea

[73] Assignee: SamSung Electronics Co., Ltd., Suwon, Rep. of Korea

[21] Appl. No.: 813,797

[22] Filed: Dec. 26, 1991

[30] Foreign Application Priority Data

Nov. 28, 1991 [KR] Rep. of Korea ............... 1991-21538

[51] Int. Cl.$^5$ .......................... G03B 7/097; G03B 9/40
[52] U.S. Cl. .................................. 354/435; 354/230; 354/234.1; 354/247
[58] Field of Search ............... 354/422, 435, 436, 437, 354/439, 440, 230, 234.1, 247, 248

[56] References Cited

U.S. PATENT DOCUMENTS 4,354,748 10/1982 Grimes et al. ............... 354/422 X
5,079,583 1/1992 Sato et al. ..................... 354/435

*Primary Examiner*—W. B. Perkey

[57] ABSTRACT

An automatic exposure device having an exposure sensor and a microprocessor includes a plurality of shuris wings each having a window of a given shape to be movable in respect to each other a motor controlled by the microprocessor for driving the movement of the plurality of shuris wings, an encoder disc for sensing a state of revolution of the motor, a counter for transmitting the state of revolution to the microprocessor by checking an encoder value recorded in the encoder disc, and a ROM table connected to the microprocessor for storing the encoder value and an exposure value corresponding to the encoder value.

19 Claims, 9 Drawing Sheets

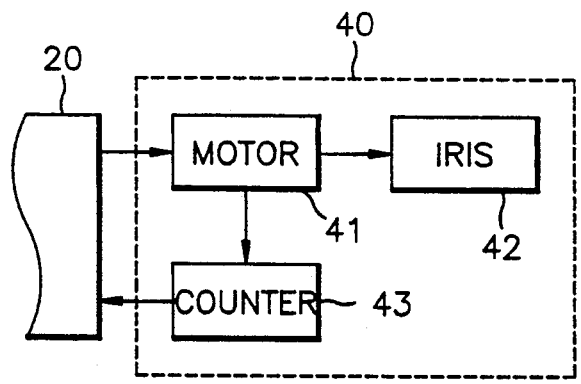
(PRIOR ART)
FIG. 1A
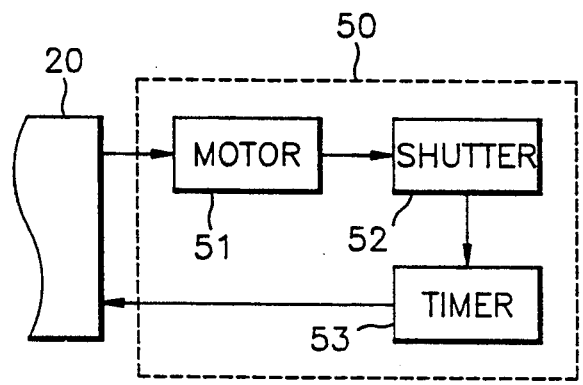
(PRIOR ART)
FIG. 1B
| EXPOSURE VALUE | IRIS STATE | SHUTTER STATE | |
|---|---|---|---|
| | | SHUTTER SPEED(v) | EXPOSURE DURATION(t) |
| | | | |
(PRIOR ART)
FIG. 1C

SHUTTER AND IRIS COMBINED AUTOMATIC EXPOSURE DEVICE

FIELD OF THE INVENTION

This invention relates generally to an exposure device of an image input device such as a camera, and more particularly an exposure device having a shutter and an iris combined in a body.

TECHNICAL BACKGROUND OF THE INVENTION

Generally, a shutter and an iris are essential structural elements in an image input device such as a camera. An optimum adjustment of an exposure is the core of subject to be solved in the camera and the exposure depends upon operations of the shutter and the iris. As generally known, the shutter controls duration of the exposure and the iris determines a focusing depth and an opening area. An exposure value is determined by the duration of exposure and the opening area. Further, the focus depth is inversely proportional to the opening area.

The states of the shutter and the iris are determined at user's option in an early type of camera. However, an automatic adjustment art by utilizing electronic elements has been generalized recently.

With reference to FIG. 1, a conventional automatic exposure device includes an exposure sensor 10, a microprocessor 20, a ROM table 30, an iris division 40 and a shutter division 50. When the exposure sensor 10 senses the exposure of an object, the microprocessor 20 controls operations of the iris division 40 and the shutter division 50 according to the data related to a shutter and an iris recorded in the ROM table 30, the data being dependent upon the exposure of the object.

With reference to FIG. 1A, the iris division 40 includes a motor 41 for operating an iris 42 under the control of the microprocessor 20, and a counter 43 for counting the number of revolutions of the motor 41, to thereby calculate the opening area of the iris 42, the information from the counter 43 being transmitted to the microprocessor 20.

With reference to FIG. 11B, the shutter division 50 includes a motor 51 for operating a shutter 52 under the control of the microprocessor 20, and a timer 53 for detecting exposure duration of the shutter 52 to transmit the information to the microprocessor 20.

The microprocessor 20 controls the iris division 40 and the shutter division 50 according to the information recorded in the ROM table 30 and interrupts the operations of the iris 42 and the shutter 52 in case of an operation state of the iris 42 and shutter 52 coinciding with a value predetermined in the ROM table 30.

Depending upon how to determine a correlated adjustment value of the iris 42 and the shutter 52, an automatic exposure device is classified as a program mode, an iris mode, and a shutter mode. In such modes, the microprocessor 20 transmits an exposure value EV detected by the exposure sensor 10 to the ROM table 30 as shown in FIG. 1C.

The ROM table 30 transmits data for establishing operation states of the shutter 42 and the iris 52 according to the exposure value EV to the microprocessor 20. The data for driving the iris 42 is pertaining to the number of revolutions of the motor 41 determining an opening area of the iris 42, and the data for driving the shutter 52 is pertaining to a moving speed V of the shutter 52 and the exposure duration t.

In the iris mode, the moving speed of the shutter V is established after the opening area of the iris is determined. In the meanwhile, in the shutter mode, the opening area of the iris is established after the moving speed of the shutter V is determined. In the program mode, a fine adjustment of the iris 42 and the shutter 52 is required because the operations of the iris and the shutter are correlated with each other.

In such conventional modes, the opening area is fixed during the duration of exposure. A curve shown in FIG. 1D shows the exposure area of the iris with respect to the duration of exposure between the opening and closing of the shutter, in the conventional exposure device including the shutter and the iris being constructed separately.

With reference to FIG. 1D, it is assumed that an opening area A is established as for the effective duration of exposure $T_E$. The effective duration of exposure $T_E$ can be expressed by an equation $T_E = T_2 + (T_1 + T_3)/2 = (T_0 + T_2)/2$, where T1 is an initial time point of exposure and T3 is a final time point of exposure after opening the shutter. It is regarded that the oblique line T1, T2 for the initial and final time points of exposure is not a straight line in the mathematical sense of the word.

In the iris 42, a scale for regulating an amount of light as the pupil of an eye is indicated as an "F" number. The F number (F#) is determined by a focal length f and an effective diameter D of a lens and can be expressed by a formula $F\# = f/D$ (Equation 1). Assuming that a section of exposed area is a circle, the area of exposure A is expressed by a formula $A = \pi R^2 = \pi D^2/4$ (Equation 2). The exposure value EV of determining an amount of light exposure is defined by a formula $2^{ev} = F\#^2/T = (\ln(\pi f^2/4A) - \ln T_e)/\ln 2$ (Equation 3). A curve shown in FIG. 1F shows a relation of the effective exposure duration and the exposure value EV drawn by the Equation 3.

In such a conventional automatic exposure device, a mechanism for regulating the iris and the shutter becomes complicated because the iris and the shutter have to be separately included regardless of the operation modes such as the program, the iris, or the shutter modes. In the program mode, it is difficult and complex to control a mechanism interdependently for securing an optimum exposure state, because the shutter and the iris are operating interdependently and a highly precise control is required.

Because locus of the curve at the initial exposure duration T1 and final exposure duration T3 is not a straight line in the mathematical sense of the word, there may occur an error in an amount of exposure expressed as a product of the effective exposure duration Te and the exposure area A of the iris.

SUMMARY OF THE INVENTION

An object of this invention is to provide an automatic exposure device incorporating the functions of a shutter and an iris into a body and a device for readily controlling an exposure state of a camera by use of a single module.

Another object of this invention is to provide an automatic exposure control device having fewer structural elements, the device being readily manufacturable.

According to an aspect of the present invention, an automatic exposure device includes an exposure sensor, a microprocessor, a ROM table and a shuris division. The shuris division includes two shuris wings having a given shape of window and moving to each other in an opposite direction. A motor drives the two shuris wings simultaneously to each other in the opposite direction under the control of the microprocessor. An encoder disc senses a state of a revolution of motor, and a counter detects an encoder value recorded in the encoder disc and transmits it to the microprocessor. The ROM table is connected to the microprocessor and stores the encoder value and an exposure value corresponding to the encoder value.

The present invention will now be described more specifically with reference to the drawings attached only by way of example.

BRIEF DESCRIPTION OF THE ACCOMPANYING DRAWINGS

FIG. 1A is a block diagram of configuration of an iris division (40) as shown in FIG. 1;

FIG. 1B is a block diagram of configuration of a shutter division (50) as shown in FIG. 1;

FIG. 1C is a ROM table showing information stored in a ROM table;

DETAILED DESCRIPTION OF A PREFERRED EMBODIMENT

Figure 2:
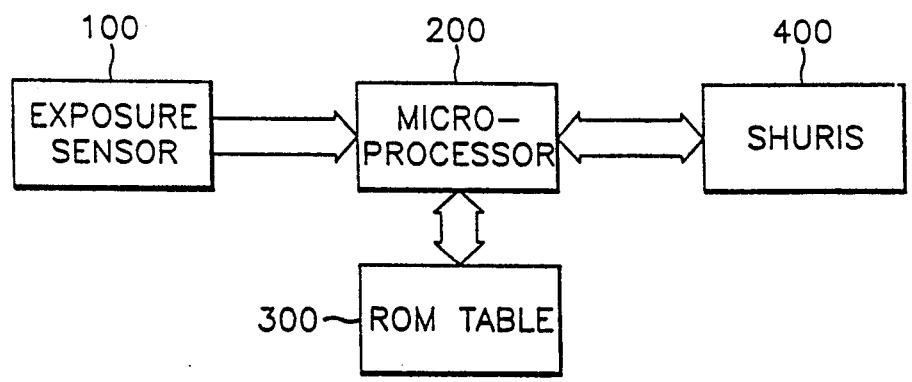
FIG. 2 is a block diagram of configuration of an exposure device according to the present invention.

With reference to FIG. 2, an exposure device according to the present invention includes an exposure sensor 100, a microprocessor 200, a ROM table 300 and a shuris (shutter+iris) division 400.

Figure 1:
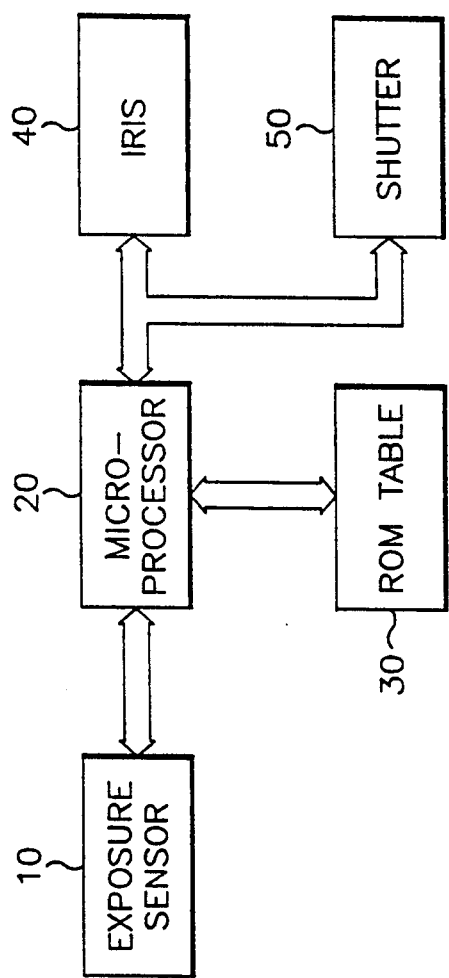
FIG. 1 is a block diagram of general configuration of a conventional exposure device.
Figure 1D:
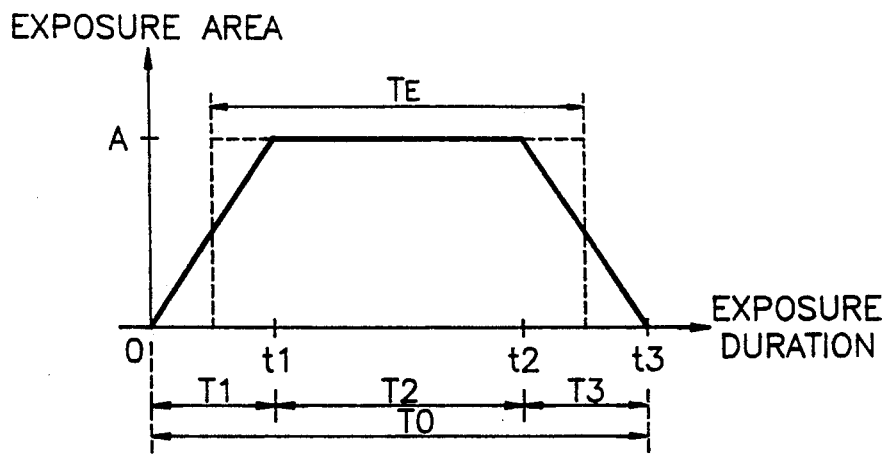
FIG. 1D is a curve showing a relation between an exposure area of an iris and an exposure duration according to a conventional exposure device.
Figure 1E:
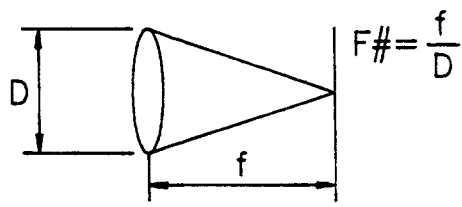
FIG. 1E is a schematic diagram showing how a F number, an effective diameter of the iris and a focal length are determined.
Figure 1F:
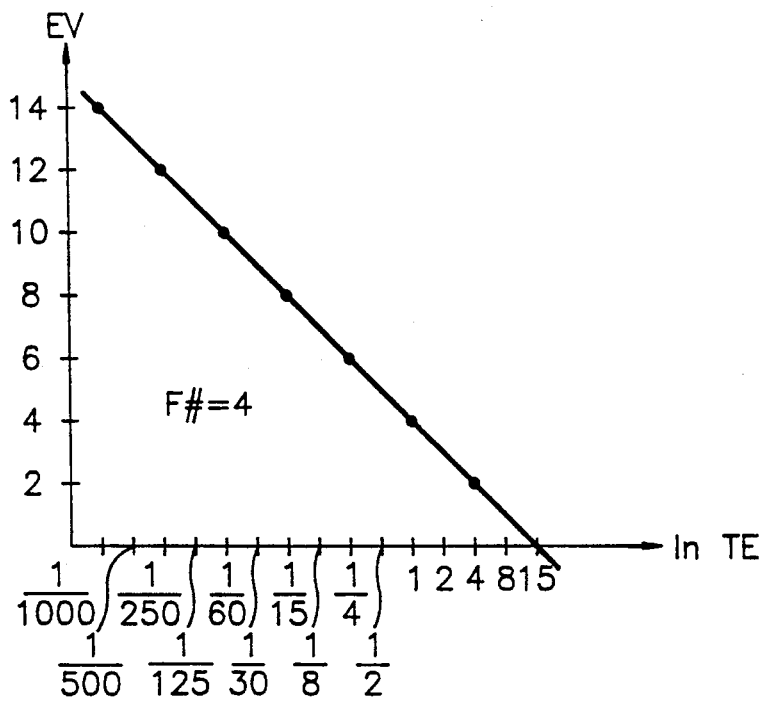
FIG. 1F is a curve showing a relation between an effective exposure duration Te and an exposure value Ev under a certain F number.

Configurations and operations of the exposure sensor 100 and the microprocessor 200 are the same as described with reference to FIG. 1. The microprocessor 200 transmits an exposure value EV from the exposure sensor 100 to the ROM table 300 and provides the shuris division 400 with an encoder value N corresponding to the exposure value EV.

Figure 3:
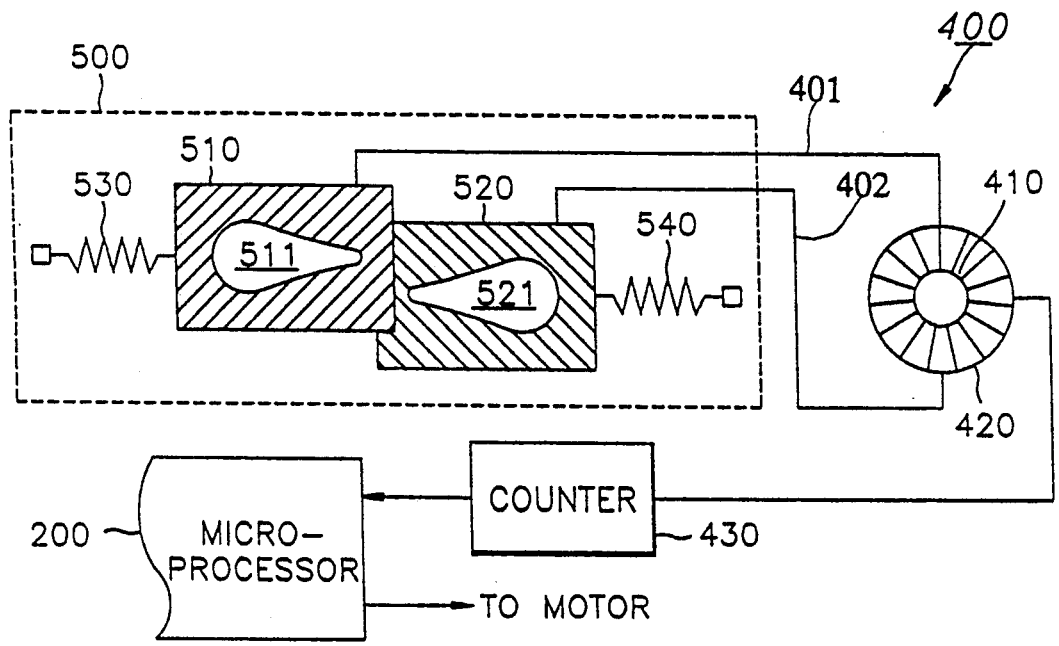
FIG. 3 is a block diagram of a preferred embodiment of a shuris (i.e , shutter+iris) division (400) as shown in FIG. 2.

With reference to FIG. 3, an embodied configuration of the shuris division 400 is illustrated. Shuris wings 510, 520 of module 500 are connected to resilient tension springs 530, 540 respectively and are making right and left movements to each other in an opposite direction by a driving motor 410. Shuris windows of a given shape 511, 521 are formed on the shuris wings 510, 520 respectively. An encoder disc 420 is installed on an exterior side of the motor 410 and has an encoder value N for sensing a state of revolution of the motor 410.

Figure 3A:
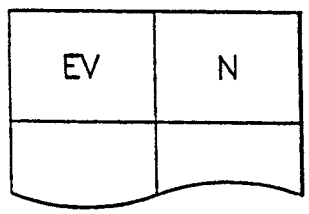
FIG. 3A is a view of a ROM table (300) of FIG. 2 according to the present invention.

The encoder value N is determined according to a corresponding exposure value EV from the ROM table 300 shown in FIG. 3A. The ROM table 300 has much simpler configuration as compared with a conventional ROM table 30 shown in FIG. 1C. A counter 430 connected to the encoder disc 420 transmits a counting result therefrom to the microprocessor 200 by checking whether the encoder value N is consistent with a value established in the ROM table 300.

The microprocessor 200 interrupts an exposure operation by stopping the drive motor 410 in case of an output of the counter 430 being consistent with the encoder value N established in the ROM table 300. An actual exposure operation is begun when the two shuris wings 510, 520 cross each other at a given speed.

Figure 4:
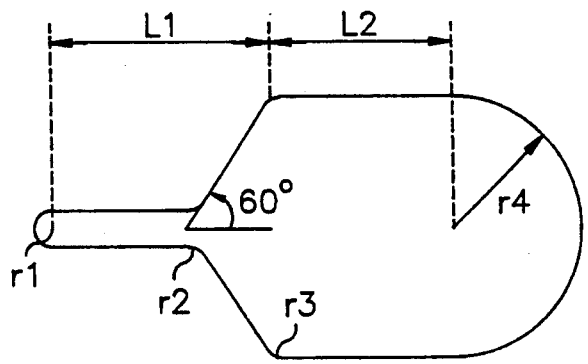
FIG. 4 is a view of an embodiment of a shuris window as shown in FIG. 3.
Figure 4A:
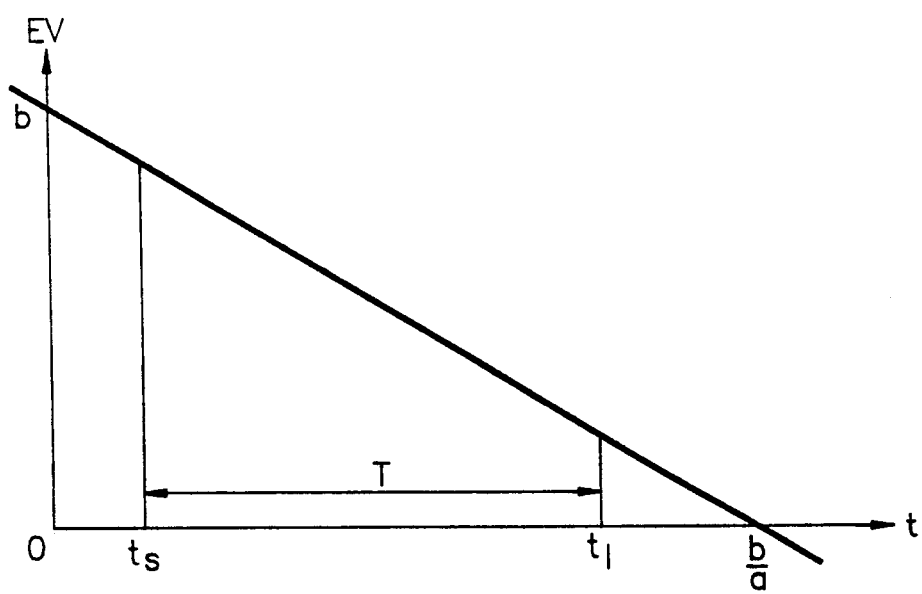
FIGS. 4A and 4B are curves for setting up an equation related to a preferable shape of shuris window according to the present invention.
Figure 4B:
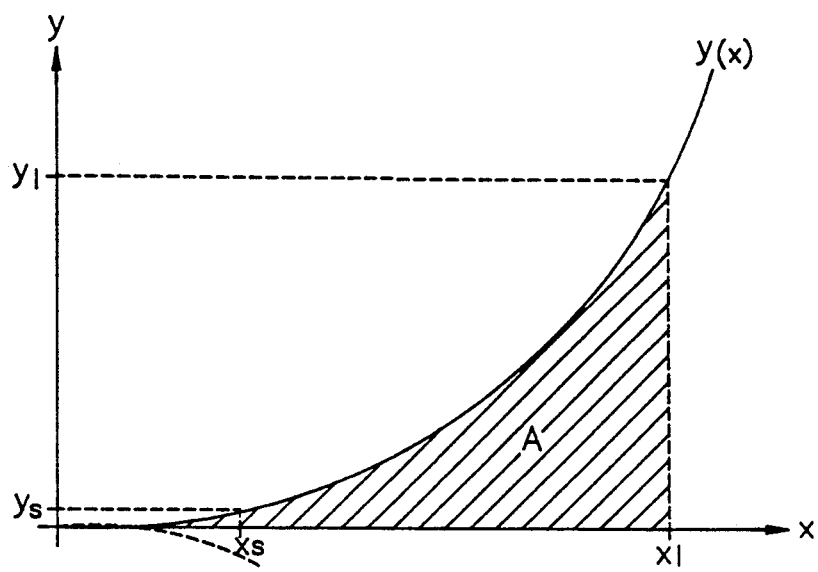

With reference to FIGS. 4, 4A and 4B, it is described how to determine a preferable shape of the shuris window.

From the equations 1, 2 and 3 which are respectively related to the F number F#, the exposure area A, and the exposure value EV, it is understood that an equation can be expressed as $$\int A dt = \frac{\pi f^2}{4} \cdot 2^{-EV}. \quad \text{(Equation 4)}$$

Because the microprocessor adopts a 8 bits or 4 bits for controlling the exposure, a control is simple when the exposure value EV is a simple or quadratic function to the exposure duration T.

It is assumed that a curve shown in FIG. 4A is expressed as a simple equation $EV = -at + b$ (Equation 5) for convenience (for a quadratic equation, $EV = -(ax-b)^2 + c$). Assuming that the exposure value EV to be controlled is given as $EV = EV_s$ and $EV = EV_1$ at $T = t_s$, $T = t_1$ respectively, the constants a, b can be determined by the equation 5. Those are:

$a = (EV_s - EV_1)/(t_1 - t_s) = (EV_s - EV_1)/T$; and $b = EV_s + a \cdot t_s$

By substituting the above values a, b into the equations 5 and 4, the equation 4 can be rewritten as $$\int A dt = \frac{\pi f^2}{4} \cdot 2^{at-b}. \quad \text{(Equation 6)}$$

Because the exposure area formed by the two shuris wings crossing each other becomes four times the area A(see the hatched portion in FIG. 4B), the equation 6 can be rewritten, if integrated, as $$4A = \frac{\pi f^2}{4} \cdot 2^{at-b} \cdot a \cdot \ln 2 \quad \text{(Equation 7)}$$

and thus, $$A = \frac{\pi f^2}{16} \cdot 2^{at-b} \cdot a \cdot \ln 2 = \int y(t)dt.$$

Consequently, the curve of FIG. 4B can be expressed as $$y(t) = \frac{\pi f^2}{16} \cdot a^2 \cdot (\ln 2)^2 \cdot 2^{at-b}. \quad \text{(Equation 8)}$$

For an optimum measurement of the shuris window to be determined by the equation 8 as shown in FIG. 4, it is preferable that $r_1 = 0.15$ mm, $r_2 = 0.50$ mm, $r_3 = 0.50$ mm, $r_4 = 2.10$ mm, $L1 = 1.78$ mm, $L2 = 2.069$ mm and $\theta = 60°$. The values $r_1$, $r_2$, $r_3$, and $r_4$ indicate curvature radii of the shuris window in FIG. 4.

Figure 5A:
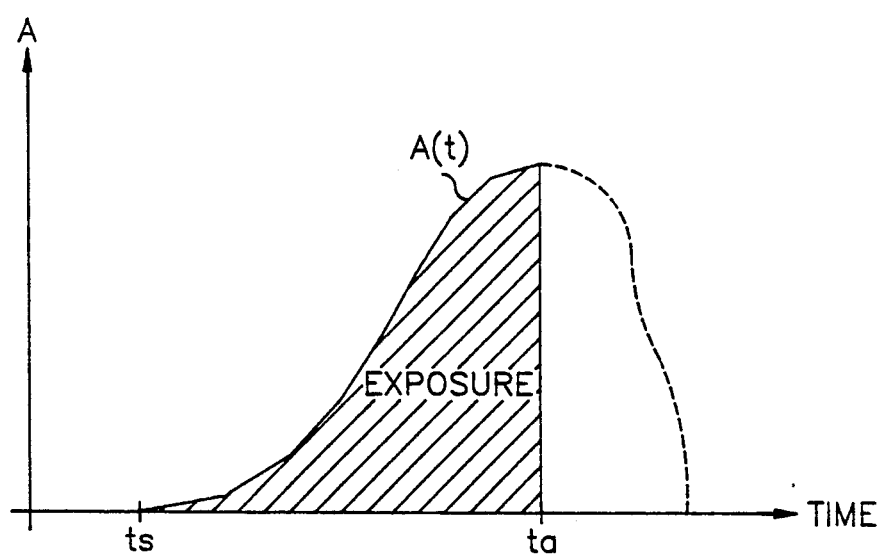
FIGS. 5A and 5B are curves showing a relation between an exposure duration and area of the shuris window and for calculating an exposure value.

The following description shows how the exposure value is determined when an exposure operation is performed by utilizing a shape of the shuris window designed according to the above description.

if the two shuris wings on which the shuris windows are formed cross each other in a given speed, an exposure value is determined by the exposure duration and area of the two shuris windows and is illustrated as shown in FIG. 5A. An area of the curve from an initial exposure time ts to a certain exposure time ta may be expressed by an equation $$\int A dt = \int \frac{\pi D^2}{4} dt. \quad \text{(Equation 9)}$$

Because the equation 9 is set up under the assumption that the exposure area A and the effective diameter D are constant, the equation 9 is not applicable in case of the exposure area being changed by the shuris window. So it is necessary to establish a conversion effective diameter Dr corresponding to an average value of the exposure area for a total exposure duration T for replacing the effective diameter D.

For determining the conversion effective diameter Dr, it is assumed that the total exposure duration is divided into N unit intervals. In an i-th interval, a unit area $A_i$ is expressed by an equation $$A_i = \frac{A_i + A_{i-1}}{2} = \frac{A(t_i) - A(t_{i-1})}{2}. \quad \text{(Equation 10)}$$

Figure 5B:
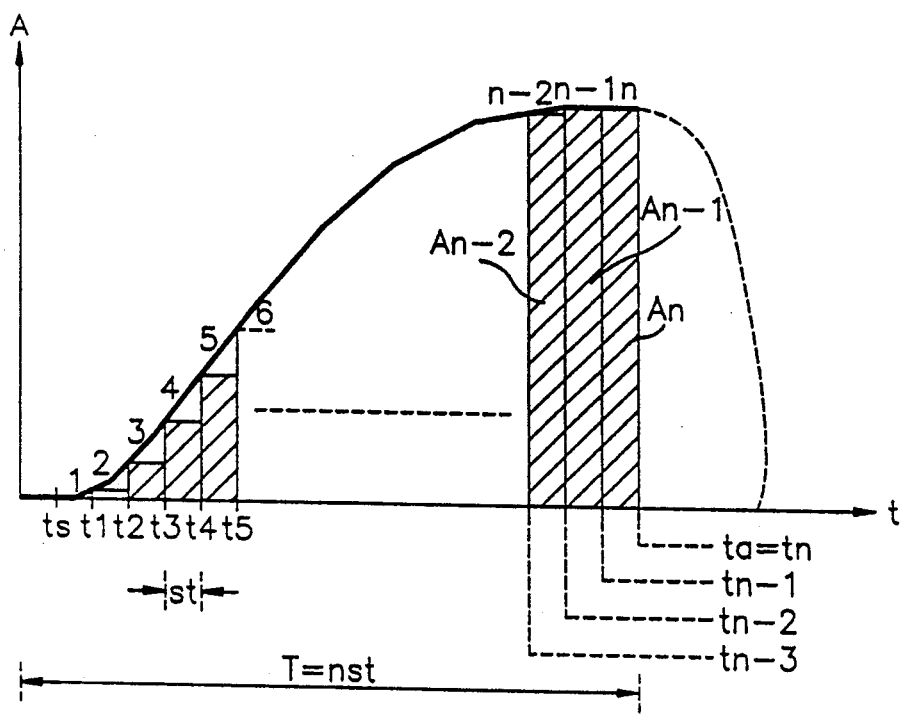

Because the speed of the shuris wing is constant, a differential value for unit time dt is multiplied by the unit area of $A_i$ and the multiplication result is summed up for the total exposure duration as shown in FIG. 5B. The summation result shows average area of the total exposure duration T. That is, $$A_{mean} = \sum_{i=1}^{n} A_i \delta t = \frac{T \cdot (\pi D_r^2)}{4}.$$

Consequently, the transformed effective diameter can be expressed as $$D_r = \sqrt{\frac{4}{\pi T} \sum_{i=1}^{n} A_i \cdot \delta t}. \quad \text{(Equation 11)}$$

Figure 5C:
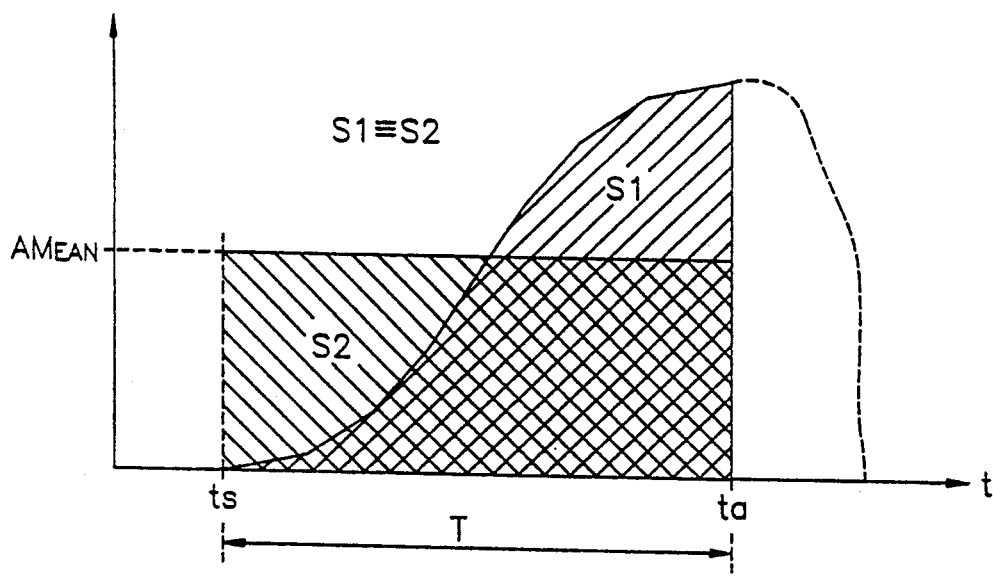
FIG. 5C is a curve for averaging the exposure value as shown in FIG. 5A.
Figure 5D:
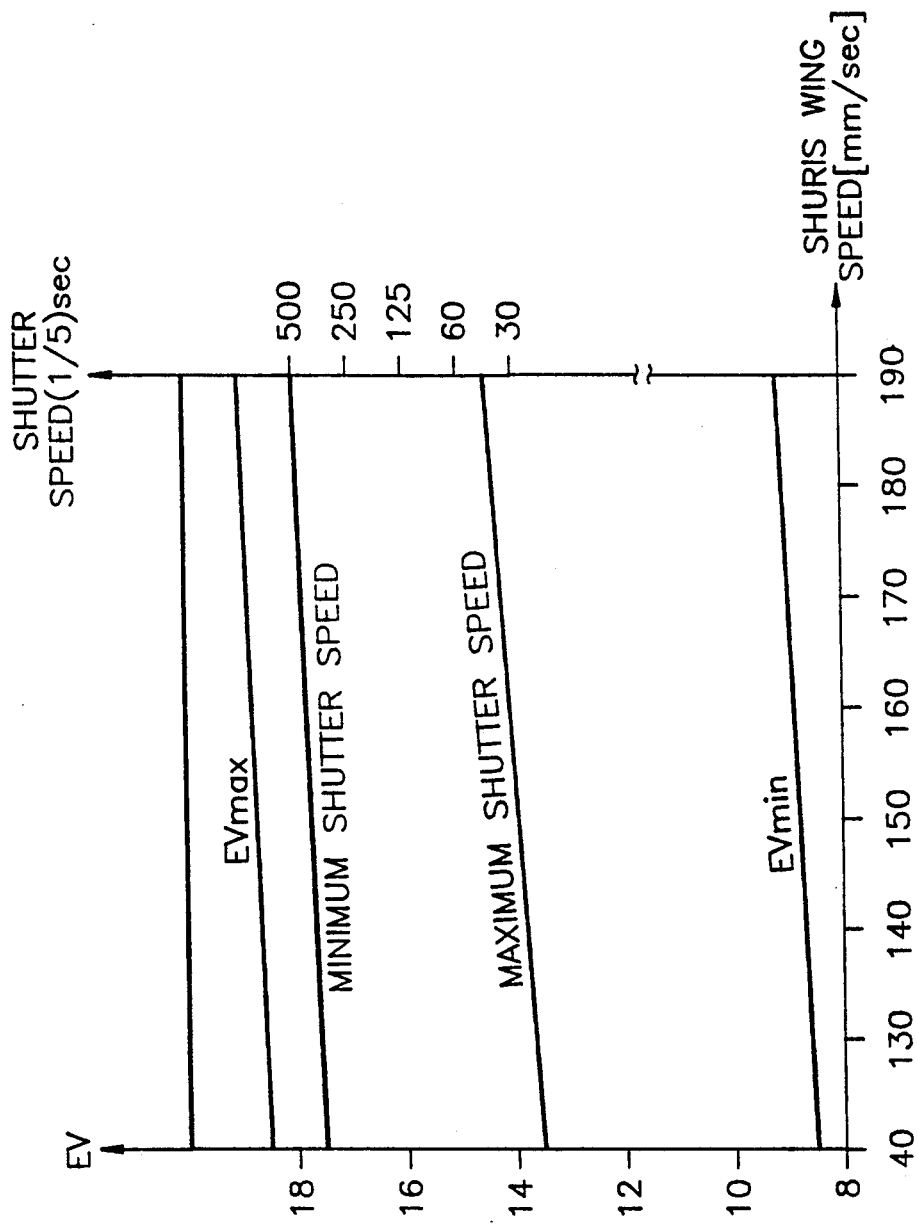
FIG. 5D is a curve showing a relation between a shutter speed, a shuris wing's moving speed and an exposure value.
Figure 5E:
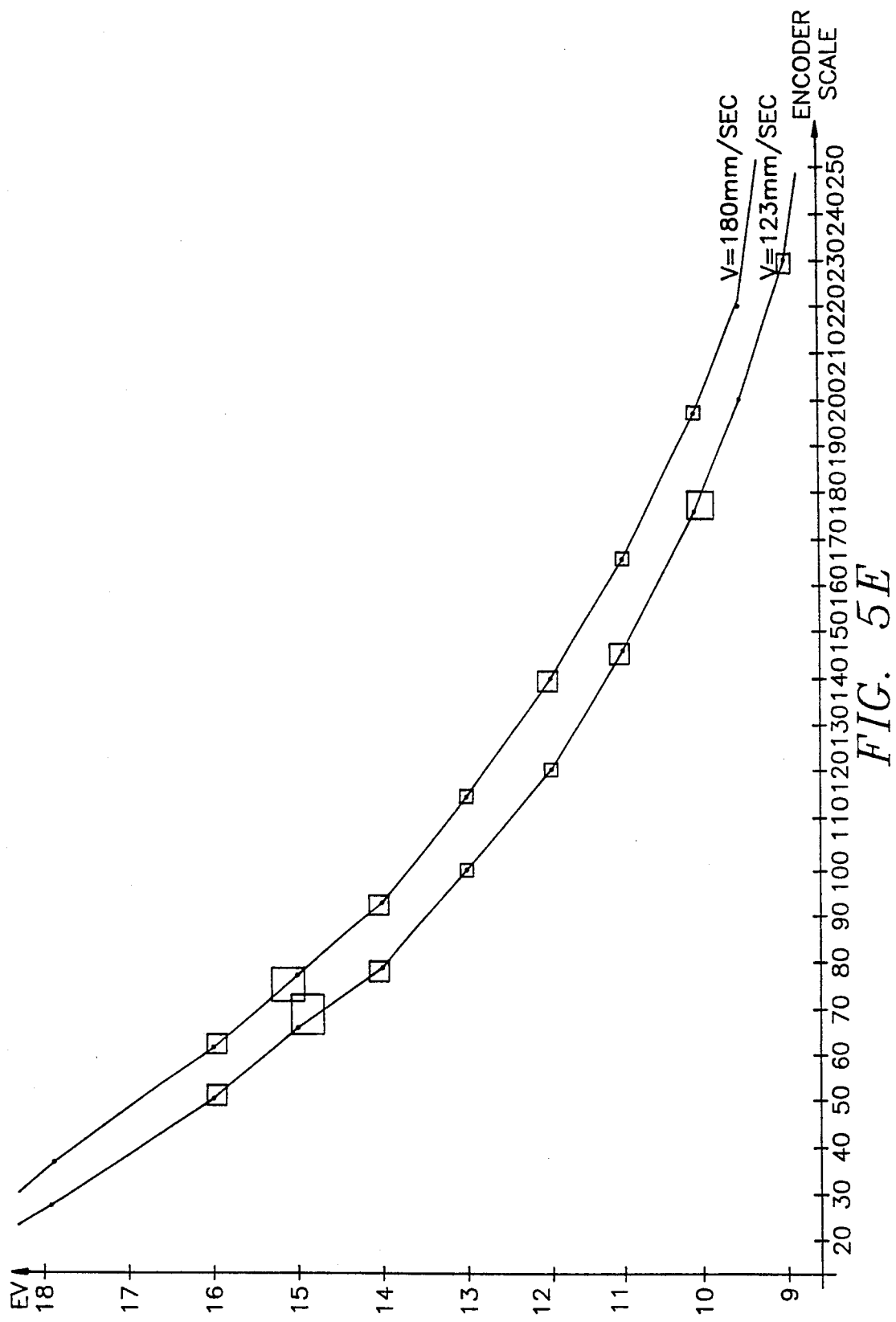
FIG. 5E is a curve showing a relation between an encoder value and an exposure value in case of the shuris wing's moving speed being established.

It is further noted from FIG. 5C that an amount of exposure in case of the exposure area being fixed to $A_{mean}$ for the total exposure duration T in a conventional iris is the same as an average area S2.

In the equation 11, the equation may be rewritten as $$D_r = 2\sqrt{\frac{S}{n\pi}} \quad \text{(Equation 12)}$$

by substituting S for the member of summation. By utilizing the fundamental equations 1, 2 and 3, the exposure value EV according to the present invention can be derived as an equation $$EV = \left( \ln \frac{n\pi f^2}{2S} - \ln T \right)/\ln 2. \quad \text{(Equation 13)}$$

As shown from in the equation 13, the exposure value EV is regulated by the exposure duration T. Because the speed of the shuris wings 510, 520 is constant, the exposure operation can be controlled via lines 401 and 402 only by displacements of the shuris wings as shown in FIG. 3.

The displacements of the shuris wings are determined by the encoder value N recorded in the encoder disc 420 for sensing the state of revolution of the drive motor 410. The exposure value EV according to the encoder value N is stored in the ROM table 300 of FIG. 3A Consequently, it is not necessary to separately adjust the exposure area of an iris, shutter speed and exposure duration because the shuris wings are driven only by the encoder value N. Namely, it can be appreciated that the exposure value according to the present invention can be adjusted by the encoder value N of a single module.

If an encoder value is set to 11.5 when the two shuris windows 511, 521 start to cross each other and set to 36.5 when the exposure area is maximized by crossing, it is possible to divide the total area into 25 intervals.

A preferable speed of the shuris wings is so established as to maximize the difference between a maximum exposure value EVmax and a minimum exposure value EVmin. Accordingly, it is preferable that the speed of the shuris wings would have a value between 123 mm/sec and 180 mm/sec.

In conclusion, the structure may be simplified by including a shuris mechanism incorporating an iris and a shutter in a body in an automatic exposure device in accordance with the present invention. Furthermore, it is convenient to control the exposure because the exposure is controlled by a single module and the exposure operation is controlled only by an encoder value by means of the shuris mechanism incorporating the functions of the iris and shutter in a body.

Although specific constructions of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. An automatic exposure device having an exposure sensor and a microprocessor, said device comprising:
   a module comprising a first shuris wing, a second shuris wing, a first spring and a second spring, said first shuris wing being connected to the first spring, and having a first window, said second shuris wing being connected to the second spring, and having a second window, said first and second shuris wings being moveable in opposite directions to one another;
   a motor, controlled by said microprocessor, connected to said first shuris wing by a first line for driving said first shuris wing, and connected to said second shuris wing by a second line for driving said second shuris wing;
   an encoder disc for sensing steps of revolution of said motor;
   counter means for counting a number of said steps sensed in said encoder disc and transmitting the number to said microprocessor; and
   table means connected to said microprocessor for storing a predetermined encoder value and a corresponding predetermined exposure value.

2. The automatic exposure device as claimed in claim 1, wherein the first window and the second window have a shape which satisfies an equation:

$$EV = -at + b$$

where EV is the predetermined exposure value, t is an exposure duration, and a and b are predetermined constants.

3. The automatic exposure device as claimed in claim 1, further comprising means for providing said predetermined exposure value in dependence upon the predetermined encoder value.

4. The automatic exposure device as claimed in claim 1, wherein said first shuris wing is resiliently forced by the first spring, and said second shuris wing is resiliently forced by the second spring.

5. An automatic exposure device comprising an exposure sensor and a microprocessor, said device comprising:
   a module comprising at least two shuris wings, each connected to a separate spring, and said each being controlled to move across each other in accordance with control signals on separate control lines connected from a motor to said each shuris wing, respectively.

6. The automatic exposure device as claimed in claim 5, further comprised of:
   said motor being controlled by said microprocessor;
   an encoder disc for sensing increments of revolution of said motor;
   a counter for determining a measured encoder value corresponding to said sensed increments, and transmitting the measured encoder value to the microprocessor; and
   a table connected to said microprocessor, said table consisting of a first column comprising a predetermined encoder value and a second column comprising a corresponding predetermined exposure value.

7. The automatic exposure device as claimed in claim 5, wherein said at least two shuris wings each have a window of a shape satisfying an equation:

$$EV = -at + b,$$

where EV is an exposure value, t is an exposure duration, and a and b are predetermined constants.

8. The automatic exposure device as claimed in claim 7, wherein said exposure duration is determined depending upon a predetermined encoder value.

9. An automatic exposure device comprising an exposure sensor, a microprocessor and a memory, said device comprising:
   a module comprising a first shuris wing with a first window of a given shape, a first tension spring connected to the first shuris wing, a first line connected to the first shuris wing, a second shuris wing with a second window of said given shape, a second tension spring connected to the second shuris wing, and a second line connected to the second shuris wing;
   means, controlled by the microprocessor, connected to the first line for driving the first shuris wing at a given speed and connected to the second line for driving the second shuris wing at the given speed;
   means for sensing increments of revolution of said driving means;
   means for determining a measured encoder value of an exposure operation by counting said increments of revolution;
   means for comparing the measured encoder value to a predetermined encoder value in the memory, said predetermined encoder value corresponding to a predetermined exposure value stored in the memory; and
   means for interrupting the exposure operation by stopping said driving means when said measured encoder value is equal to said predetermined encoder value.

10. An automatic exposure apparatus, comprising:
    a table in a memory, said table consisting of a first column comprising a predetermined exposure value, and a second column comprising a predetermined encoder value corresponding to the predetermined exposure value;
    a microprocessor connected to the memory;
    a module comprising a first shuris wing with a first window, a first tension spring connected to the first shuris wing, a first line connected to the first shuris wing, a second shuris wing with a second window, a second tension spring connected to the second shuris wing, and a second line connected to the second shuris wing;
    a motor, controlled by the microprocessor, connected to the first line for driving the first shuris wing and connected to the second line for driving the second shuris wing;
    an encoder disc for sensing given steps of revolution of said motor;
    a counter for counting a number of said sensed given steps of revolution;
    means for determining whether the number corresponds to said predetermined encoder value; and
    means for stopping said motor when said predetermined encoder value corresponds to said number.

11. An automatic exposure method, comprising the steps of:

sensing an exposure value with a sensor;

locating a predetermined exposure value in a table along with a corresponding predetermined encoder value, said predetermined exposure value corresponding to said sensed exposure value;

driving a motor in response to said predetermined encoder value, said motor being connected to a first line for driving a first shuris wing connected to a first spring, and said motor being connected to a second line for driving a second shuris wing connected to a second spring, wherein a single module comprises the first shuris wing, the first spring, the first line, the second shuris wing, the second line and the second spring;

counting steps of an encoder corresponding to increments of revolution of the motor;

determining whether said counted steps equals the predetermined encoder value;

stopping the motor when the counted steps equals the predetermined encoder value; and resiliently forcing said first shuris wing in response to a tension of said first spring, and resiliently forcing said second shuris wing in response to a tension of said second spring.

12. The method of claim 11, wherein said driving step comprises driving said first shuris wing and said second shuris wing at a speed between 123 mm/sec and 180 mm/sec.

13. An automatic exposure method, comprising the steps of:

receiving an exposure value representative of selected exposure duration and aperture size;

comparing the received exposure value with a predetermined exposure value among a plurality of exposure values stored in a memory;

when the received exposure value equals the predetermined exposure value, providing a predetermined encoder value corresponding to the predetermined exposure value;

enabling a motor to drive first and second shuris wings, positioned in a single module and having first and second windows respectively, in opposite directions at a given speed in response to said predetermined encoder value; and disabling said motor from driving said first and second shuris wings when a state of revolutions of said motor reaches said predetermined encoder value.

14. The method of claim 13, wherein said single module further comprises:

said first shuris wing comprising said first window of a first shape, said first shuris wing being connected to a first tension spring and a first line; and said second shuris wing comprising said second window of a second shape, said second shuris wing being connected to a second tension spring and a second line.

15. The method of claim 14, further comprised said first and second tension springs being resiliently forcing said first shuris wing and said second shuris wing to move in opposite directions with respect to each other in response to said predetermined encoder value.

16. An automatic exposure device, comprising:

means for providing a sensed exposure value representative of selected exposure duration and aperture;

means for comparing the sensed exposure value with a predetermined exposure value, said predetermined exposure value being stored in a memory with a corresponding predetermined encoder value;

a motor for driving first and second shuris wings, positioned in a single module and having first and second windows respectively, in opposite directions with respect to each other at a given speed in response to said predetermined encoder value when the sensed exposure value equals the predetermined exposure value;

means for detecting a number of revolutions of said motor while said motor drives said first and second shuris wings in said opposite directions at said given speed;

means for comparing said number of revolutions with the predetermined encoder value; and means for disabling said motor from driving said first and second shuris wings when said number of revolutions equals said predetermined encoder value.

17. The automatic exposure device of claim 16, wherein said single module further comprises:

a first spring and a first line both connected to the first shuris wing; and a second spring and a second line both connected to the second shuris wing.

18. The automatic exposure device of claim 17, wherein the first line is connected from the first shuris wing to the detecting means, and the second line is connected from the second shuris wing to the detecting means for enabling said detecting means to monitor movements of said first and second springs by detecting said number of revolutions of said motor.

19. The automatic exposure device of claim 16, wherein said memory consists of:

a first column comprising the predetermined exposure value; and a second column comprising the predetermined encoder value corresponding to the predetermined exposure value.

* * * * *

UNITED STATES PATENT AND TRADEMARK OFFICE
CERTIFICATE OF CORRECTION

PATENT NO. : 5,245,380

DATED : September 14, 1993

INVENTOR(S) : Jac-Wan Yang

It is certified that error appears in the above-indentified patent and that said Letters Patent is hereby corrected as shown below:

Column 1, line 45, change FIG. 1B to --FIG. 1B --

Column 2, line 37, change $2^{ev}$ to -- $2^{EV}$ --;

Column 4, line 49 after "EV=" delete "minus" -- - --;

line 51 preceing "and" change "EV," to -- $EV_s$ --;

UNITED STATES PATENT AND TRADEMARK OFFICE
CERTIFICATE OF CORRECTION

PATENT NO. : 5,245,380
DATED : 14 September 1993
INVENTOR(S) : Jae-Wan Yang

It is certified that error appears in the above-indentified patent and that said Letters Patent is hereby corrected as shown below:

Column 5,

Line 19, change "$L1=1.78_{mm}$" to --$L1=1.785_{mm}$--;

Column 6,

Line 31, after "by" insert --adjusting the --.

Signed and Sealed this

Fourth Day of April, 1995

Attest:

BRUCE LEHMAN

Attesting Officer     Commissioner of Patents and Trademarks